UNITED STATES PATENT OFFICE.

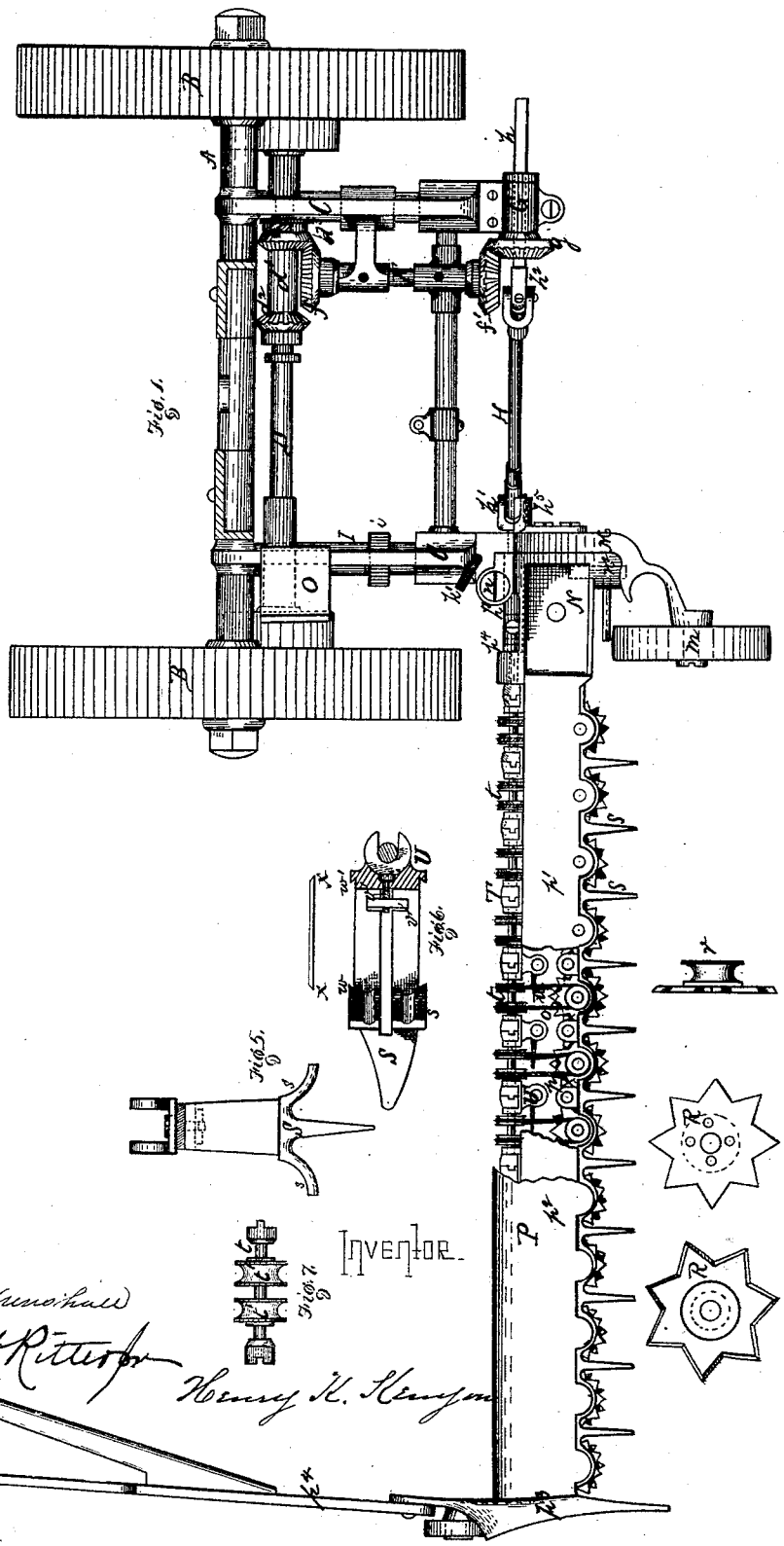

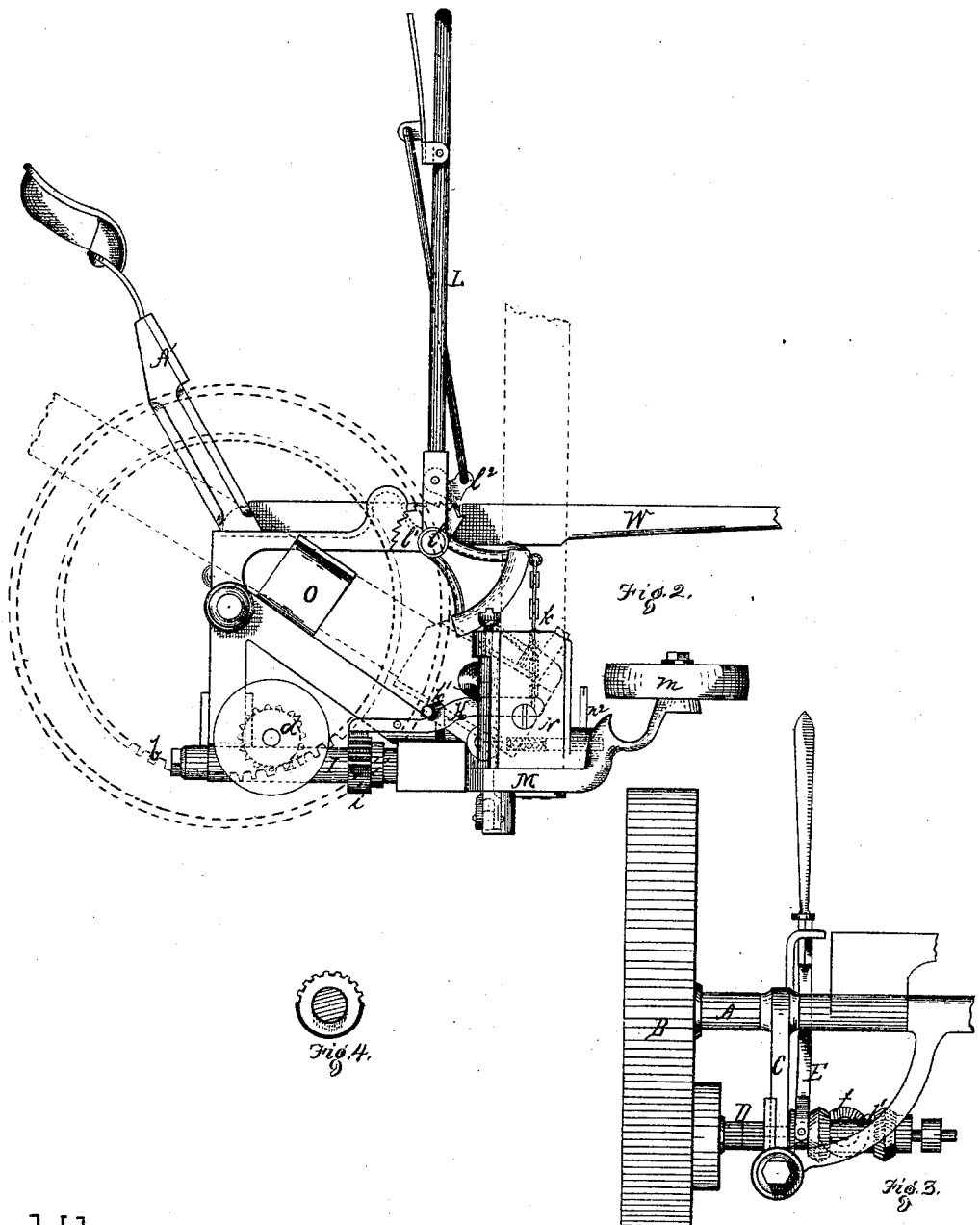

HENRY K. KENYON, OF WEST FALLS, NEW YORK, ASSIGNOR OF ONE-HALF HIS RIGHT TO ROBERT B. ALLEN, OF PARKER'S LANDING, PA.

IMPROVEMENT IN MOWERS.

Specification forming part of Letters Patent No. 176,140, dated April 18, 1876; application filed April 7, 1876.

*To all whom it may concern:*

Be it known that I, HENRY K. KENYON, of West Falls, in the county of Erie and State of New York, have invented a new and useful Improvement in Mowing-Machines; and I do hereby declare the following to be a full, clear, and exact description thereof, reference being had to the accompanying drawing, forming part of this specification, in which—

Figure 1 is a plan view of a mowing or reaping machine, the carriage and driver's seat broken away to show my improvements. Fig. 2 is a side elevation, two positions of the cutter-bar, and portions of the driving-wheel and gear, being shown in dotted lines. Fig. 3 is a sectional rear view, showing the shipping-lever of the reversing-gear. Fig. 4 is a detached view of the oscillating shaft, its ratchet-wheel and lever for locking and controlling the cutter-bar. Figs. 5 and 6 are modifications of the construction and attachments of the finger-guard and bearing-blocks for facilitating their removal, and Fig. 7 is a detached view of one section of the driving-shaft of the cutter-bar.

Like letters refer to like parts wherever they occur.

My invention relates, first, to the construction of the drawing-shaft of the cutter-bar and cutters, and to the manner of operating the cutters of a mower or reaper, whereby the several parts of the cutter may be readily removed and replaced, and the edges of the cutters preserved; second, to the hinging of the cutter-bar and construction of the driving-gear, whereby the cutter may be carried between the carriage-seat and wheel; third, to the combination of reversing mechanism, with rotary cutters for reversing the direction of rotation, so that either edge of the cutters may be used alternately; fourth, to the construction and combination of the main frame and cutter-bar, whereby the cutter-bar may be raised, lowered, and held at any desired angle while cutting over sloping surfaces.

I will now proceed to describe my invention so that others skilled in the art to which it appertains may make and use the same.

A indicates the main axle, provided with the wheels B, and having the usual, or any approved carriage and driver's seat A', secured thereon. C is the main frame hung loosely on axle A, so as to have a free motion to accommodate itself to the irregularities of the ground over which the machine moves. Journaled in the main frame is the driving-shaft D, provided at each end with a pinion, $d$, loose upon the shaft, but having the well-known ratchet mechanism for causing the pinion to revolve with shaft D in one direction. $d^1$ is a sliding sleeve, connected to the shaft by a spline, or like means, for causing the sleeve to revolve with the shaft, and controlled by a shipping-lever, E, pivoted on the main frame C, the shipping-lever being locked in any required position by a rack, E', and within reach of the driver's seat. Upon the sleeve $d^1$ are two bevel-pinions, $a^2 d^3$, one of which, according to the position of the sleeve, engages with a bevel-pinion, $f$, on the end of shaft F. The pinions $d$ of the main driving-shaft engage with internal spur-gear wheels $b$ on the main carrying and driving wheels B. F is a second driving-shaft, also journaled on the main frame, and provided at each end with a bevel-pinion, one of which, $f$, gears with one of the bevel-pinions of the sliding sleeve of the main driving-shaft, the other pinion $f'$ gearing with a bevel-pinion, $g$, secured to a sleeve, G, journaled on the forward part of the frame. This sleeve G has a square or irregular opening for the reception of the sliding shaft or bolt $h$, which is connected by a ball or universal joint to the universal rotating shaft H. H is a shaft for communicating power to the sectional driving-shaft of the cutter-bar, and is connected thereto by a ball or universal joint, $h^1$, and a series of extensible rod and joint connections, $h^2 h^3 h^4$. The universal joint $h^1$ is protected by a shield or guard plate, $h^5$, secured to the coupling-piece M, and which serves to deflect dirt, grass, &c. I is a shaft, journaled in the main frame at right angles to the main driving-shaft and the cutter-bar, and provided with a ratchet, $i$, with which engages the short arm of a lever, K, pivoted on the main frame.

The long arm of lever K is connected by a chain, $k$, to the segment of the lifting-lever L, which is pivoted, as at $l$, to the carriage A$^1$, and has the usual rack and ratchet $l^1 l^2$. In order that the short arm of lever K shall not engage with the ratchet-wheel $i$, except when forced to do so by the raising of the long arm, I overweight the long arm, and, to prevent the lifting of the long arm of K when the lifting-lever L is used to lift the whole frame, I provide a catch, $k^1$, upon the main frame for locking down the long arm of the lever at such times as it is desirable to permit the shaft I to revolve. M N indicate the jointed stock-pieces by means of which the union between the cutter-bar and main frame is effected. The stock-piece M is secured to the forward end of shaft I, so as to turn therewith, and is provided at its outer end with the usual caster-wheel $m$. N is connected to M by a hinge-joint, $n$, at right angles to the cutter-bar, so that when the cutter-bar is brought to a vertical position by rotating shaft I, the cutter-bar can be lowered onto the rest O and secured to the main frame, thus carrying the cutter-bar, when not in use, between the main frame or carriage and the wheel. In order to preserve the rigidity of the cutter-bar when in use, a locking device, (or spring-bolt,) $n^2$, is placed on N, opposite the hinge $n$, and engages with stock-piece M, so as to confine the movements of the cutter-bar to those permitted by the shaft I. P indicates the cutter-bar, of which $p$ is the bottom plate, $p^1$ the top plate, $p^2$ the cap-plate, and $p^3$ the the shoe. The shoe may be provided with the usual adjustable caster-wheel and track clearer or separator $p^4$. The rear edge of the top and bottom plates $p$ $p^1$ may be straight, but the front edge is rounded or scalloped at regular intervals for the journals of the rotary cutters. R R represent the rotary cutters, which are set in two tiers, the cutters of one tier—either the upper or lower, as preferred—having one more tooth to the cutter than its fellow of the opposite tier. Connected to each cutter is a pulley, $r$, by means of which it is driven. S S represent the finger-guards, provided with curved flanges $s$ $s$, said guards being located between each pair of the rotary cutters and the curved flanges $s$ $s$ serving to inclose the pulleys of the cutters, as well as to strengthen and brace the guard and give a finish to the bar. These finger-guards do not act with the cutters, but simply serve to divide the grass or grain and direct it to the cutters. T is the sectional driving-shaft of the cutter-bar. It is formed of a series of short shafts or sections, $t$ $t$, each of which is provided with two rigid pulleys, $t^1$ $t^1$, for driving the cutters, and with a slotted and a keyed end or equivalent means for connecting it to the adjacent sections. U U are a series of bearing-blocks, which correspond in number to the finger-guards and are secured to the top and bottom plates at points opposite said guards. Each of these blocks affords a bearing for one end of two shafts or sections, $t$, and also serves to lock the ends of the sections by preventing any longitudinal play of the sections. Secured to each bearing-block is a guide-hook, $u$, for taking the twist of the driving-belts and holding the belts off the cutters. $o$ indicates a belt or chain which is passed around the pulleys of the driving-shaft and cutters, and serves to drive the cutters. The connection between the heel of the cutter-bar and the stock-piece $n$ is readily made by sliding the top and bottom plates over the coupling-piece and securing them by a bolt.

In Figs. 5 and 6 I have shown a modification of the construction of the bearing-blocks and finger-guards, which enables me to secure the several parts composing the cutter-bar, with greater facility and less number of screws. In this modification I extend back the tail-pieces of the finger-guards until they will meet the bearing-block, and form lugs upon the tail-pieces. The bearing-block is then adapted to form a seat for the ends of the tail-pieces, and a nut or slide-piece, $v$, engages with the lugs on the tail-pieces, and serves with the binding-screw $v'$ to draw the bearing-blocks and finger-guards together. In order to secure the top and bottom plates by and to the guards and bearings, the plates $p$ $p^1$ are beveled, as at $x$ and $x'$, to take under lips $w$ and $w'$ on the finger-guard and bearing-block, and in securing the several parts of the cutter-bar, the finger-guard, bearing-blocks, and top and bottom plates being placed in position, the binding-screw $v'$ is tightened, and secures the several parts.

It will be seen that, by this modification, all the fastenings are made by a screw or pin for each set of cutters, acting as a journal therefor, and a binding-screw for each finger-guard and bearing-block. The screw or pin forming the journal of the cutters may rest in either holes or slots formed in the top and bottom plates. The cap-plate $p$ extends over the rear of the cutter-bar until it meets the bottom plate, forming therewith, and with the flanges of the finger-guards, a box, which incloses and protects the mechanism of the cutter-bar. This cap-plate may be secured by set-screws, latches, or in any other suitable manner.

W is the tongue, which is secured to the carriage by bolts, and provided with a draft-rod, which may be secured to the main frame or to the axle, if preferred.

The operation of my machine is as follows: The machine being drawn forward, power is communicated from the internal spur-gearing of the main wheel to the main driving-shaft; thence through one bevel-pinion of the sleeve and the secondary driving-shaft to the universal rotating shaft having the ball-joints, and thence to the sectional driving-shaft of the cutter-bar, which, by means of the belts or chains, revolves the upper tier of the rotary cutters in one direction, and the lower tier in the opposite direction.

The cutters, as before stated, vary in the number of cutting-teeth, and, consequently, are continually cutting with a shearing cut; and, as no two teeth of the upper and lower tier ever exactly coincide, no clogging or jerking movement of the cutters can occur.

The teeth or cutters are double-edged, or sharpened to cut both ways, as shown, so that when the cutting is being done by one set of edges any grit, sand, or other substance passing between the cutters will act to whet or sharpen the opposite edges that are not in use.

After the machine has been run for a while with the cutters revolving in one direction, the shipping-lever is thrown over so as to bring the other bevel-pinion of the sliding sleeve $d'$ into gear with the shaft F, thus reversing the rotation of the cutters, and bringing the opposite cutting-edges into action, permitting the edges that were previously in use to become sharpened in turn by the passing grit, &c. This method of operating the cutters will be found to preserve the cutting-edges, and prevent the necessity for removal and grinding.

When a finger-guard, section of shaft, or set of cutters is to be removed, all that is necessary is to remove the cap-plate, draw out the section of shaft, and loosen one or two screws which secure the finger-guard, bearing-block, and cutters, when any pieces of the series may be withdrawn without disturbing the rest.

As the machine is drawn along, the shaft I, being free to oscillate, allows the cutter-bar, which is secured thereto so as to form a floating cutter-bar, to accommodate itself to the surface over which it is moving, and the toe or outer end to either drop or raise, as required; but when it is desired to raise the cutter-bar bodily, the catch $k'$ is turned to free the long arm of lever K, and the short arm, engaging with the ratchet-wheel $i$ on shaft I, locks the shaft so that it cannot be oscillated by the weight of the cutter-bar, and the cutter-bar is thus raised with the frame by the lifting-lever L retaining that angle with relation to the main frame that it occupied at the time it was locked. When the cutter-bar is again lowered, the instant it touches the ground it will oscillate shaft I in a reverse direction, and thus free the short arm of lever K. When it is desirable to raise or lower the main frame and heel of the cutter-bar without controlling the cutter-bar itself, all that is necessary is to lock down the long arm of lever K by means of catch $k'$.

When the cutter is not in use, and the machine is being moved from place to place, care is had first to turn the universal rotating shaft and the driving-shaft sections that pass through the stock-pieces M N, so that the hinges are in a horizontal plane. The cutter-bar is lifted into the vertical position, rotating the shaft I. The sliding shaft of the driving-sleeve G permits the universal rotating shaft to slide horizontally, and accommodate itself to the angle assumed by the cutter-bar, when the spring-bolt $n^1$ of the coupling-pieces being retracted, the cutter-bar can be lowered to place on rest O, and the shipping-lever E, being moved to the middle notch of the rack, will throw the driving-mechanism out of gear, thus relieving the machine and fitting it for the road.

The advantages derived from my improvement are as follows: First, as to the cutters, the preservation of the cutting-edge; secondly, the facility with which the cutters and finger-guards may be removed, repaired, or replaced; thirdly, less power is necessary to drive the knives, for the reason that only about one-half of the face of the cutters act. In the ordinary reciprocating knives about three-fourths of the face of the cutting-tooth acts, and the blade must consequently be speeded to obtain from one hundred and twenty-five to one hundred and seventy-five reciprocations for each revolution of the knife, while, with my devices, if the driving-shaft revolves fifteen times for every revolution of the driving-wheel, the cutting-teeth, say seven in the upper and eight in the lower, making fifteen in all, gives two hundred and twenty five strokes, thus obtaining in rapidity of stroke more than is lost in length of stroke, and this without speeding the machine, and consequently with a less expenditure of power.

The advantages as to the manner of carrying the cutter-bar when not in operation are, first, that it balances the frame; second, no weight is thrown on the tongue; third, safety and security are attained; and, fourthly, the machine occupies less space than when the cutter is carried outside the wheel or upright. As to the devices for controlling the cutter-bar, they raise and lower it without changing its position relative to the main frame or the surface over which it is cutting. Finally, the cutters being driven by belts or chains which can slip upon the pulleys, there is no danger of breaking the cutters when stones or like objects obstruct the cut.

Having thus described my improvement, what I claim as my invention, and desire to secure by Letters Patent, is—

1. In the cutter-bar of a reaper or mower, the sectional driving-shaft, in combination with the two tiers of rotary cutters, adapted to cut in reverse directions, and suitable devices for transmitting power from the shaft to the cutters, substantially as and for the purpose specified.

2. In the cutter-bar of a reaper or mower, the combination of a driving-shaft, having suitable pulleys, with two tiers of rotary cutters, and belts or chains for driving the cutters from the shaft, substantially as and for the purpose specified.

3. The combination of two tiers of rotary toothed cutters, each tooth having two cutting-edges with suitable mechanism for reversing the rotation of the cutters, substantially as and for the purpose specified.

4. The combination of two tiers of rotary cutters adapted to be run in opposite directions, the cutters of one tier having fewer teeth than the cutters of the other tier, substantially as and for the purpose set forth.

5. In the cutter-bar of a reaper or mower, the combination of the finger-guard with the bearing-block, the two pieces abutting and secured by a single binding-screw, substantially as and for the purpose specified.

6. The combination of the top and bottom plates, having beveled edges, with the finger-guards and bearing-blocks, having lips or shoulders which take over the beveled edges of the plates, and a binding-screw for securing the parts, substantially as specified.

7. In a cutter-bar, having rotary cutters driven by a shaft and belts or like mechanism, the combination of the flanged or winged finger-guards with the bottom plate and cap plate for inclosing and protecting the mechanism, substantially as described.

8. In a reaping or mowing machine, the floating cutter-bar, in combination with the main frame and mechanism for locking and lifting the bar at any desired angle relatively to the main frame, substantially as described.

9. The combination of the cutter-bar with the oscillating shaft, having ratchet mechanism, and with the lifting-lever and intermediate ratchet-lever, substantially as and for the purpose described.

10. The combination of the cutter-bar, the hinged stock-pieces and the oscillating shaft, one stock-piece being connected to the oscillating shaft and the other to the cutter-bar, substantially as and for the purpose specified.

11. The combination of the main frame, lifting-lever, pivoted lever $k$, and catch $k'$ for locking down the long arm of the lever so that the main frame and heel of the cutter-bar may be raised without locking the cutter-bar, substantially as and for the purpose specified.

12. In the cutter-bar of a reaper or mower, the combination of two tiers of rotary cutters adapted to be run in opposite directions, with finger-guards interposed between each pair of cutters, substantially as and for the purpose specified.

13. In the cutter-bar of a reaper or mower, the combination of a single driving-shaft, having fixed pulleys, with two rotary cutters, one immediately above the other, adapted to run in opposite directions, and an endless belt for driving the two cutters in reverse directions.

In testimony whereof I, the said HENRY K. KENYON, have hereunto set my hand.

HENRY K. KENYON.

Witnesses:
JAMES I. KAY,
R. C. WRENSHALL.